US 7,446,497 B2

(12) United States Patent
Iwashita et al.

(10) Patent No.: US 7,446,497 B2
(45) Date of Patent: Nov. 4, 2008

(54) FIXED-POSITION STOP CONTROL APPARATUS FOR ROTATION SHAFT

(75) Inventors: Yasusuke Iwashita, Yamanashi (JP); Takahiro Akiyama, Yamanashi (JP); Masakazu Niwa, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 155 days.

(21) Appl. No.: 11/609,880

(22) Filed: Dec. 12, 2006

(65) Prior Publication Data
US 2007/0138989 A1 Jun. 21, 2007

(30) Foreign Application Priority Data
Dec. 19, 2005 (JP) .............. 2005-365465

(51) Int. Cl.
*G05B 11/18* (2006.01)
(52) U.S. Cl. .............. 318/594; 318/592; 318/600; 318/569; 318/560
(58) Field of Classification Search ............ 318/594, 318/592, 600, 569, 560
See application file for complete search history.

(56) References Cited
U.S. PATENT DOCUMENTS

| | | | |
|---|---|---|---|
| 3,699,317 A * | 10/1972 | Middleditch | 700/187 |
| 3,815,453 A * | 6/1974 | Takano et al. | 82/124 |
| 4,769,583 A | 9/1988 | Goor | |
| 4,775,135 A * | 10/1988 | Leibinger et al. | 269/303 |
| 5,030,900 A * | 7/1991 | Kono et al. | 318/592 |
| 5,519,297 A * | 5/1996 | Kono et al. | 318/594 |
| 6,011,374 A * | 1/2000 | Ulbrich | 318/569 |
| 6,310,457 B1 * | 10/2001 | Iwashita et al. | 318/570 |
| 6,316,903 B1 * | 11/2001 | Shamoto | 318/700 |
| 6,386,008 B1 * | 5/2002 | Virtanen et al. | 72/19.8 |

FOREIGN PATENT DOCUMENTS

| | | | |
|---|---|---|---|
| JP | 55086389 A | | 6/1980 |
| JP | 61178142 A | | 8/1986 |
| JP | 63284601 A | | 11/1988 |
| JP | 06195118 A | | 7/1994 |
| JP | 8106326 A | | 4/1996 |

OTHER PUBLICATIONS

Notice of Reasons for Rejection for JP2005-365465 mailed Dec. 11, 2007.
Notice of Reasons for Rejection of Patent Application No. 2005-365465 mailed Sep. 11, 2007.

* cited by examiner

*Primary Examiner*—Rita Leykin
(74) *Attorney, Agent, or Firm*—Lowe, Hauptman, Ham & Berner, LLP (57) ABSTRACT

A fixed-position stop control apparatus (10) includes: a move-instruction generating means (22) for generating a move instruction for each control cycle; a position loop control means (25) for position controlling a rotation shaft (61) for each control cycle according to the move instruction generated by the move-instruction generating means; and a speed loop control means (35) for speed controlling the rotation shaft according to one of a speed instruction generated by a higher level control apparatus (45) and a predetermined speed instruction, thereby switching the speed control of the rotation shaft by the speed loop control means to the position control of the rotation shaft by the position loop control means. In this fixed-position stop control apparatus, the move instruction generated by the move-instruction generating means has acceleration smaller than the acceleration corresponding to the acceleration and deceleration ability of the rotation shaft. With this arrangement, time required for the rotation shaft to stop at a fixed position can be decreased.

5 Claims, 6 Drawing Sheets

FIXED-POSITION STOP CONTROL APPARATUS FOR ROTATION SHAFT

BACKGROUND OF THE INVENTION

1. Field of the Invention

The present invention relates to a fixed-position stop control apparatus for a rotation shaft that is used to stop a rotation shaft of a machine tool or the like at a desired position.

2. Description of the Related Art

In a fixed-position stop control for stopping a rotation shaft of a motor of a machine tool such as a computer numerically-controlled machine tool, a mechanical origin that becomes a basis when stopping is determined on a rotation shaft, and a reference point is also determined at a fixed side.

A fixed-position stop control apparatus for a rotation shaft performs a speed control, using one of a speed instruction generated by a higher level control apparatus and a predetermined speed instruction. When a desired stop position is generated as a stop-position instruction, a speed control of the rotation shaft is changed over to a position control of the rotation shaft. Thereafter, the rotation shaft stops at the stop position based on the position control.

Figure 5:
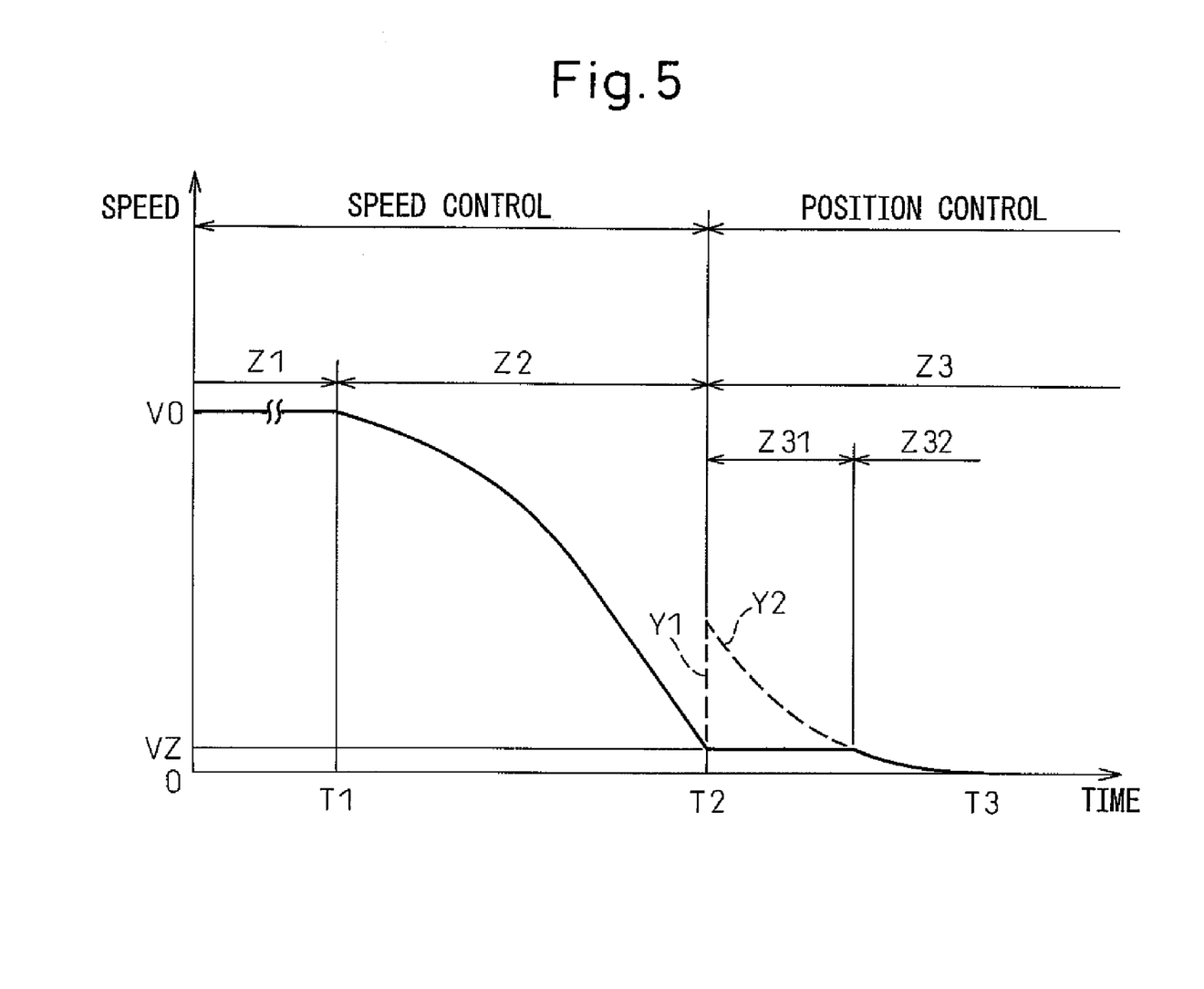
FIG. 5 is a diagram showing a relationship between a current speed of a rotation shaft and time according to an related art.

FIG. 5 is a diagram showing a relationship between a current speed of a rotation shaft and time according to an related art as disclosed in Japanese Patent Unexamined Publication No. 6-195118, for example. As shown in FIG. 5, in a zone Z1, the rotation shaft is speed-controlled at a constant speed V0 according to an instruction from a higher level control apparatus. When the rotation shaft needs to be stopped (at time T1), the speed of the rotation shaft is gradually decreased to a predetermined speed VZ, as shown in a zone Z2. When the speed of the rotation shaft decreases to the speed VZ, the control of the rotation shaft is switched from the speed control (the zone Z2) to a position control (a zone Z3) at a time T2.

According to the position control of the related art, a total move amount until the rotation shaft stops is input in one operation as a stop-position instruction. The speed instruction of the rotation shaft in the zone Z3 is expressed using a position gain PG, as given by the following expression (1).

"Speed instruction"="PG"×"Position difference of the rotation shaft"  (1)

The speed instruction given by this expression (1) is drawn as an exponential curve which is convex downward relative to time.

However, usually, the speed instruction given by the above expression does not coincide with the predetermined speed VZ. Therefore, the speed changes rapidly between the zone Z2 and the zone Z3. Specifically, as shown by a broken line Y1 in a small zone Z31, a speed instruction that exceeds the acceleration and the deceleration ability of the rotation shaft is generated during a shift from the zone Z2 to the zone Z3.

Therefore, by setting a speed instruction upper limit, a speed instruction in the zone Z3 is expressed as given by the following expression (2).

"Speed instruction"=min("PG"×"Position difference of the rotation shaft", "Position instruction upper limit")  (2)

With this arrangement, continuity of the speed instruction can be secured between the zone Z2 and the zone Z3.

When the expression (2) is used, the zone Z3 includes the small zone Z31 in which the speed instruction upper limit is employed, and a small zone Z32 in which "PG"×"Position difference of the rotation shaft" expressed by the exponential function is employed. In the small zone Z31, the speed of the rotation shaft corresponds to the speed instruction upper limit, and is, therefore, constant. This means that the acceleration and deceleration ability of the rotation shaft is not used in the small zone Z31. Because the small zone Z31 is present, the time required to reach a stop at the fixed position becomes long.

Figure 6:
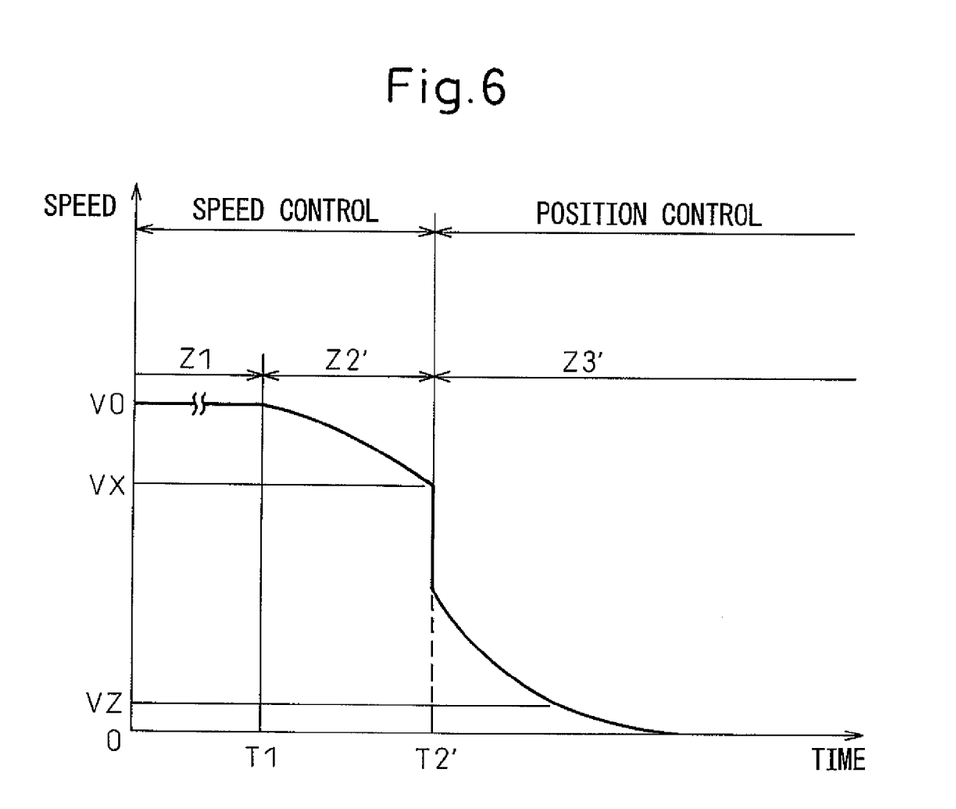
FIG. 6 is another diagram showing a relationship between a current speed of a rotation shaft and time according to a related art.

On the other hand, FIG. 6 shows a state that a speed control is changed to a position control while the rotation shaft is rotated at a relatively high speed, that is, a speed control (a zone Z2') is changed over to a position control (a zone Z3') at a speed VX (VZ<VX<V0). In this case, a speed instruction that exceeds the deceleration ability of the rotation shaft is generated in the zone Z3' as shown in FIG. 6. Due to the foregoing, a relatively large mechanical shock occurs at the time of shifting from the zone Z2' to the zone Z3' (i.e., at the time of the switching from the speed control to the position control).

For the above reasons, in the related art, the predetermined speed VZ shown in FIG. 5 must be made relatively small. However, when the predetermined speed VZ is made small, the small zone Z31 is extended correspondingly, and the time required to reach a stop at the fixed position becomes long.

The present invention has been made in the light of the above situation. It is an object of the present invention to provide a fixed-position stop control apparatus for a rotation shaft capable of decreasing time required for a rotation shaft to stop at a fixed position.

SUMMARY OF THE INVENTION

In order to achieve the above object, according to a first aspect of the present invention, there is provided a fixed-position stop control apparatus for a rotation shaft, including: a move-instruction generating means for generating a move instruction for each control cycle; a position loop control means for position controlling the rotation shaft for each control cycle according to the move instruction generated by the move-instruction generating means; and a speed loop control means for speed controlling the rotation shaft according to one of a speed instruction generated by a higher level control apparatus and a predetermined speed instruction, the fixed-position stop control apparatus capable of switching the speed control of the rotation shaft by the speed loop control means to the position control of the rotation shaft by the position loop control means, wherein the move instruction generated by the move-instruction generating means has acceleration smaller than acceleration corresponding to the acceleration and deceleration ability of the rotation shaft.

According to a second aspect of the invention, there is provided a fixed-position stop control apparatus for a rotation shaft, including: a move-instruction generating means for generating a move instruction for each control cycle; a position loop control means for position controlling the rotation shaft for each control cycle according to the move instruction generated by the move-instruction generating means; and a speed loop control means for speed controlling the rotation shaft according to one of a speed instruction generated by a higher level control apparatus and a predetermined speed instruction, the fixed-position stop control apparatus capable of switching the speed control of the rotation shaft by the speed loop control means to the position control of the rotation shaft by the position loop control means, wherein the move instruction generated by the move-instruction generating means has acceleration corresponding to the acceleration and deceleration ability of the rotation shaft.

Namely, according to the first and the second aspects, because acceleration that exceeds the acceleration and deceleration ability of the rotation shaft is not used, a zone which employs a speed instruction upper limit is not necessarily required. Therefore, the time required for the rotation shaft to stop at a fixed position can be decreased. Based on the above configuration, it is not necessary to provide a speed instruction upper limit either.

According to a third aspect of the invention, there is provided the fixed-position stop control apparatus according to the first or the second aspect, further including an acceleration detecting means for detecting an acceleration of the rotation shaft during acceleration or deceleration, wherein the acceleration of the move instruction is acceleration immediately before the switching from the speed control to the position control, detected by the acceleration detecting means.

Namely, according to the third aspect, the acceleration immediately before the switching from the speed control to the position control is a value significantly close to a limit value of the acceleration and deceleration ability of the rotation shaft. Therefore, more suitable fixed-position stop control can be carried out.

According to a fourth aspect of the invention, there is provided the fixed-position stop control apparatus according to any one of the first to the third aspects, further including a move instruction smoothing means for smoothing the move instruction generated by the move-instruction generating means, wherein a move instruction smoothed by the move instruction smoothing means is supplied to the position loop control means.

Namely, according to the fourth aspect, because a change of speed or acceleration becomes smooth, it becomes possible to further suppress a mechanical shock applied to the rotation shaft when the speed or the acceleration changes.

According to a fifth aspect of the invention, there is provided the fixed-position stop control apparatus according to any one of the first to the fourth aspects, further including a stop-position instruction generating means for generating a stop-position instruction of the rotation shaft, wherein the move-instruction generating means generates the move instruction based on the stop-position instruction generated by the stop-position instruction generating means, the higher level control apparatus generates other stop-position instruction, and when the higher level control apparatus generates the other stop-position instruction, the position loop control means performs a position control based on a difference between the stop-position instruction and the other stop-position instruction.

Namely, according to the fifth aspect, even when the higher level control apparatus generates other stop-position instruction, the fixed-position stop control apparatus can be operated corresponding to this generating operation.

These objects, characteristics, advantages and other objects, characteristics, and advantages of the present invention will become clearer from details of representative embodiments of the present invention shown in the accompanying drawings.

DETAILED DESCRIPTION

Embodiments of the present invention are explained below with reference to the accompanying drawings. In the following drawings, the same members are assigned like reference numerals, and scales are suitably changed in the drawings to facilitate understanding.

Figure 1:
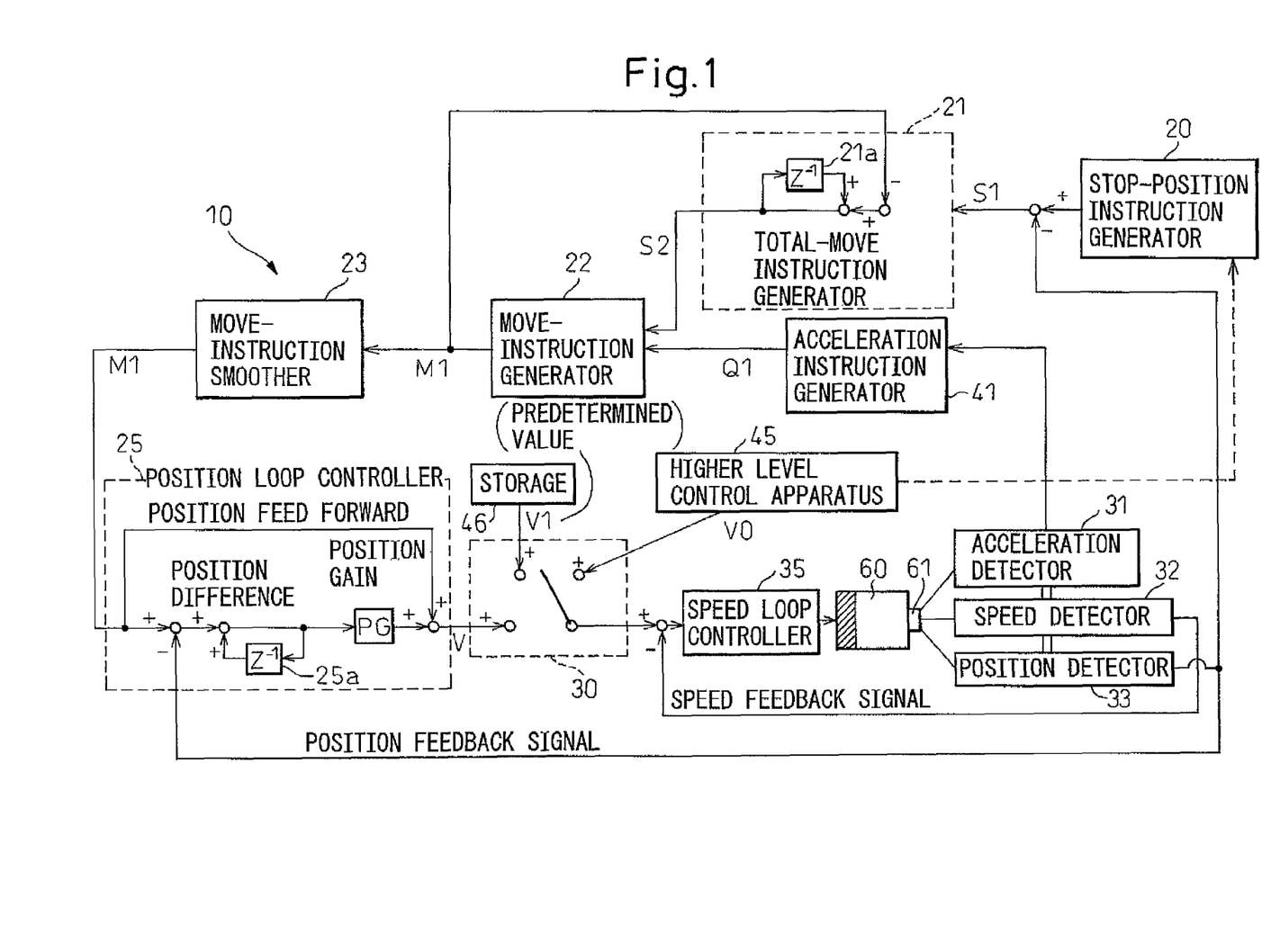
FIG. 1 is a configuration diagram of a fixed-position stop control apparatus for a rotation shaft according to the present invention.

FIG. 1 is a configuration diagram of a fixed-position stop control apparatus for a rotation shaft according to the present invention. A fixed-position stop control apparatus 10 of the present invention is connected to a motor 60 having a rotation shaft 61, as shown in FIG. 1. The motor 60 is a servo motor that is used in a machine tool such as a computer numerically-controlled machine tool. As shown in FIG. 1, the rotation shaft 61 of the motor 60 is provided with an acceleration detector 31 that detects acceleration of the rotation shaft 61, a speed detector 32 that detects a speed of the rotation shaft 61, and a position detector 33 that detects a position of a mechanical origin relative to a fixed-side reference point on the rotation shaft 61. The acceleration detector 31, the speed detector 32, and the position detector 33 are related to each other. For example, acceleration of the rotation shaft 61 or a position of the rotation shaft 61 can be calculated or estimated, based on a speed of the rotation shaft 61 detected by the speed detector 32.

The fixed-position stop control apparatus 10 may be a digital computer. In FIG. 1, the fixed-position stop control apparatus 10 includes a stop-position instruction generator 20 that generates a stop-position instruction of the rotation shaft 61, an acceleration instruction generator 41 that generates an acceleration instruction Q1, a total-move-instruction generator 21 that generates a total-move instruction S2 of the rotation shaft 61, and a move-instruction generator 22 that generates a move instruction M1 for each control cycle.

The fixed-position stop control apparatus 10 further includes a position loop controller 25 that is used to control a position of the rotation shaft 61, and a speed loop controller 35 that is used to control a speed of the rotation shaft 61.

A changeover unit 30 changes over so as to select one of a speed instruction V generated by the position loop controller 25, a predetermined speed instruction V1 stored in advance in a storage 46, and a speed instruction V0 generated by a higher level control apparatus 45. The higher level control apparatus 45 is a programmable logic controller (PLC), for example.

Figure 2:
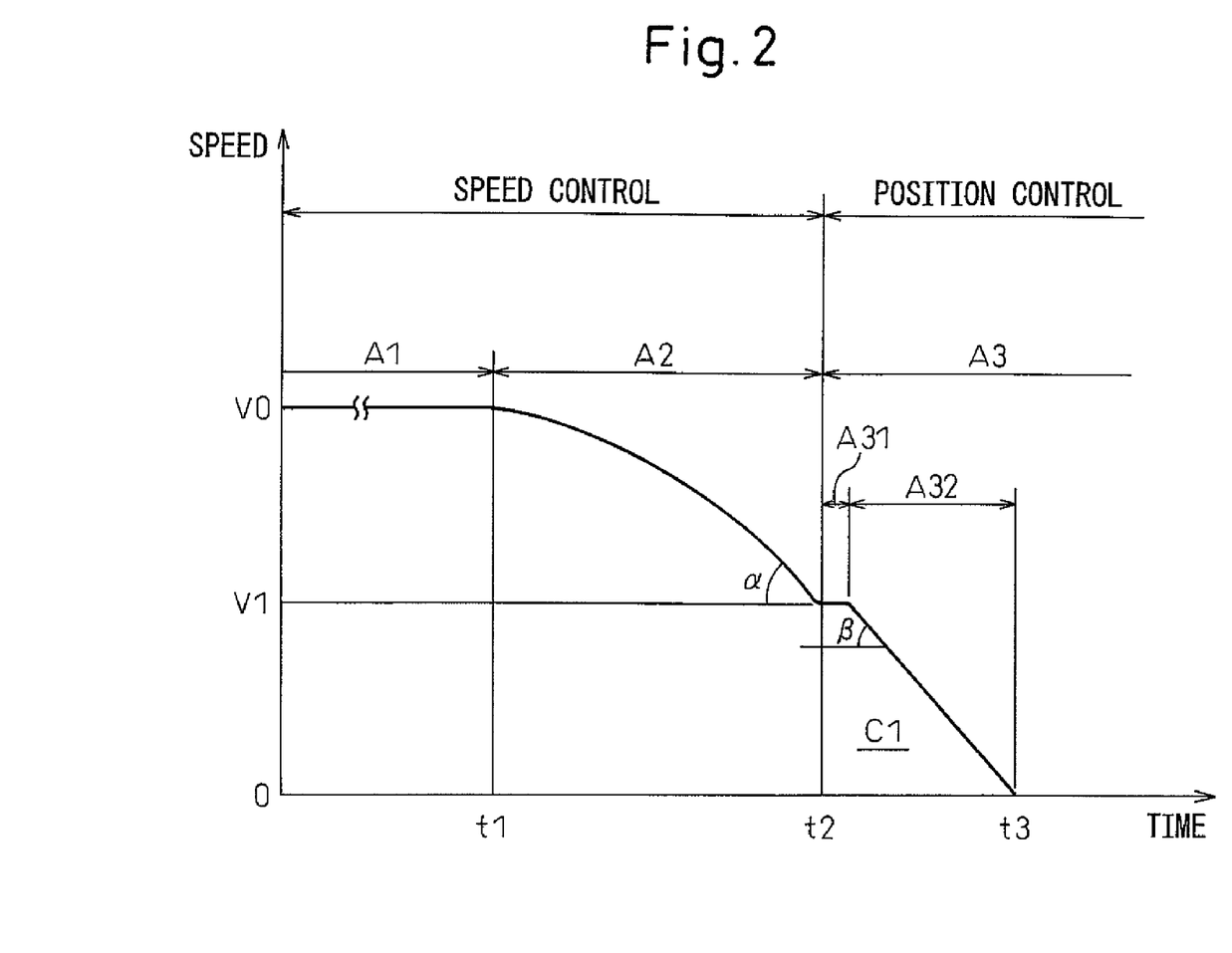
FIG. 2 is a diagram showing a relationship between a current speed of a rotation shaft and time in the fixed-position stop control apparatus according to the present invention.

FIG. 2 is a diagram showing a relationship between a current speed of a rotation shaft and time in the fixed-position stop control apparatus according to the present invention. In FIG. 2, a vertical axis shows a speed of the rotation shaft 61, and a horizontal axis shows time.

The operation of the fixed-position stop control apparatus 10 is explained below with reference to FIG. 1 and FIG. 2. It is assumed that, at the beginning, the changeover unit 30 is switched to select the speed instruction V0 generated by the higher level control apparatus 45. In other words, as can be seen from the zone A1 in FIG. 2, the rotation shaft 61 is speed controlled at the speed V0, at the beginning. As can be seen from FIG. 1, a difference between a speed (a speed feedback signal) of the rotation shaft 61 detected by the speed detector 32 and a speed (the speed V0, at the beginning) changed over by the changeover unit 30 is input to the speed loop controller 35.

When a situation that makes the rotation shaft 61 of the motor 60 stop occurs at time t1 in FIG. 2, the changeover unit 30 is switched to select the predetermined speed V1. The predetermined speed V1 is obtained in advance by experiment or the like, and is stored in advance in the storage 46 of the fixed-position stop control apparatus 10. The speed V1 is smaller than the speed V0. More specifically, the speed V1 is a value between the speed VZ and the speed VX (i.e., VZ<V1<VX).

Thus, the speed of the rotation shaft 61 is controlled to gradually come near to the predetermined speed V1, as shown in the zone A2 in FIG. 2. In the zone A2, the speed of the rotation shaft 61 is merely decreased to reach the predetermined speed V1. Therefore, the gradient of the curve in the zone A2, that is, the acceleration of the rotation shaft 61, does not exceed the deceleration ability.

The acceleration of the rotation shaft 61 does not reach the limit value of the acceleration and deceleration ability immediately after the speed is changed from the zone A1 to the zone A2. Therefore, the curve in the zone A2 is expressed as a function which is convex upward. The acceleration of the rotation shaft 61 (expressed as an angle $\alpha$ in FIG. 2) immediately before the speed of the rotation shaft 61 reaches the predetermined speed V1 is approximately equal to the limit value of the acceleration and deceleration ability.

When the speed of the rotation shaft 61 reaches the predetermined speed V1 at time t2, the changeover unit 30 shown in FIG. 1 is switched to select the speed instruction V generated by the position loop controller 25. Simultaneously with this changeover operation, the stop-position instruction generator 20 generates a stop position of the rotation shaft 61 as a target position. In addition, the position detector 33 detects a current position of the rotation shaft 61. A difference obtained by subtracting the current position from the target position is set as a total-move instruction initial value S1 of the rotation shaft 61.

The following process is performed for each control cycle of the rotation shaft 61. The total-move-instruction generator 21 generates a total-move instruction S2 based on the total-move instruction initial value S1, and supplies the generated total-move instruction S2 to the move-instruction generator 22. As shown in FIG. 1, a speed of the rotation shaft 61 detected by the acceleration detector 31 is generated as the acceleration instruction Q1 in the acceleration instruction generator 41. This acceleration instruction Q1 can be supplied to the move-instruction generator 22. An accumulator 21a of the total-move-instruction generator 21 adds the total-move instruction S2 in the last control cycle.

The move-instruction generator 22 generates the move instruction M1, based on either both or one of the total-move instruction S2 and the acceleration instruction Q1. The move instruction M1 means a distance over which the rotation shaft 61 is moved during a certain control cycle. This move instruction M1 is supplied to the position loop controller 25 via a move-instruction smoother 23 described later. As shown in FIG. 1, the move instruction M1 is also supplied to the total-move-instruction generator 21, and is subtracted from the total-move instruction initial value S1 for each control cycle.

The position loop controller 25 calculates a difference between the move instruction M1 and the current position of the rotation shaft 61 detected by the position detector 33. An accumulator 25a adds a difference in the last control cycle to the above difference, and multiplies a position gain PG by the added result. Thereafter, the move instruction M1 is added to this value, and the added result is output from the position loop controller 25 as the speed instruction V. As shown in FIG. 1, a difference between the speed instruction V that passes through the changeover unit 30 and the speed feedback signal is supplied to the speed loop controller 35, thereby the rotation shaft 61 is driven.

In the present invention, the acceleration of the rotation shaft 61 related to the move instruction M1 is equal to or smaller than the acceleration and deceleration ability of the rotation shaft 61. For example, in FIG. 2, the move instruction M1, including the speed instruction V equal to the predetermined speed V1, is generated in a small zone A31 of the zone A3. In other words, the acceleration included in the move instruction M1 in the small zone A31 is zero.

Next, the move instruction M1, having the acceleration equal to or smaller than the acceleration and deceleration ability of the rotation shaft 61, is generated in a small zone A32. In the small zone A32, the position loop controller 25 continues to generate the move instruction M1 including such acceleration. At time t3, the speed of the rotation shaft 61 becomes zero, and the rotation shaft 61 stops. The dimension of an area C1 surrounded by a line between times t2 and t3 and a solid line expressing a speed in FIG. 2 corresponds to the total-move instruction initial value S1.

As explained above, according to the present invention, the move instruction M1 including the acceleration that exceeds the acceleration and deceleration ability of the rotation shaft 61 is not generated in the zone A3 including the small zones A31 and A32. Thus, in the present invention, the "speed instruction upper limit" according to the related art explained with reference to FIG. 5 does not need to be set. Further, the small zone A31 of the present invention can be made consideravely smaller than the small zone Z31 according to the related art. Alternatively, in the present invention, the small zone A31 may be excluded as described later. Consequently, in the present invention, the time (t3-t2) of the zone A3 concerning the position control can be made shorter than the time (T3-T2) according to the related art. As a result, the time (t3-t1) required for the rotation shaft 61 to stop can be decreased.

Particularly, as shown in FIG. 2, it is preferable that the acceleration detector 31 detects the acceleration of the rotation shaft 61 immediately before time t2 when the speed of the rotation shaft 61 becomes the speed V1, and that the move instruction M1 including the acceleration immediately before time t2 is output through the acceleration instruction generator 41 and the move-instruction generator 22. In other words, it is preferable that the acceleration $\alpha$ in the zone A2 immediately before time t2 and acceleration $\beta$ in the zone A3 after time t2 shown in FIG. 2 are set equal. The acceleration $\alpha$ immediately before the switching from the speed control to the position control is a value significantly close to the limit value of the acceleration and deceleration ability of the rotation shaft 61. Therefore, a more suitable fixed-position stop control can be carried out. Further, because the speed at the time of changing from the speed control to the position control becomes continuous, a mechanical shock that occurs at a time of change can be suppressed.

While the small zone A31 in which the speed of the rotation shaft 61 becomes constant is present in the embodiment explained with reference to FIG. 2, this small zone A31 is not necessarily required. As described above, the dimension of the area C1 corresponds to the total-move instruction initial value S1. Therefore, as long as the dimension of the area C1 does not change, the speed of the rotation shaft 61 in the zone A3 may be changed.

Figure 3A:
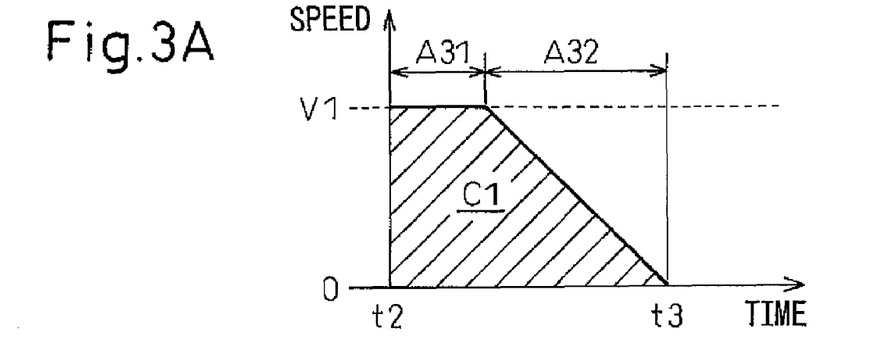
FIG. 3A is an enlarged diagram of a relationship between a speed in a zone A3 and time shown in FIG. 2.
Figure 3B:
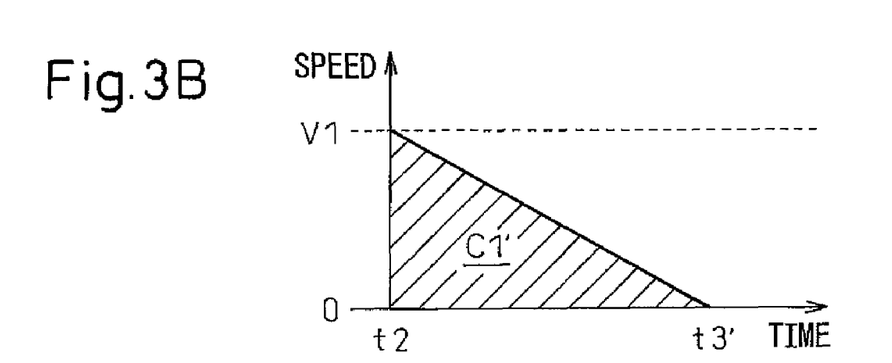
FIG. 3B is another enlarged diagram of a relationship between a speed in the zone A3 and time shown in FIG. 2.
Figure 3C:
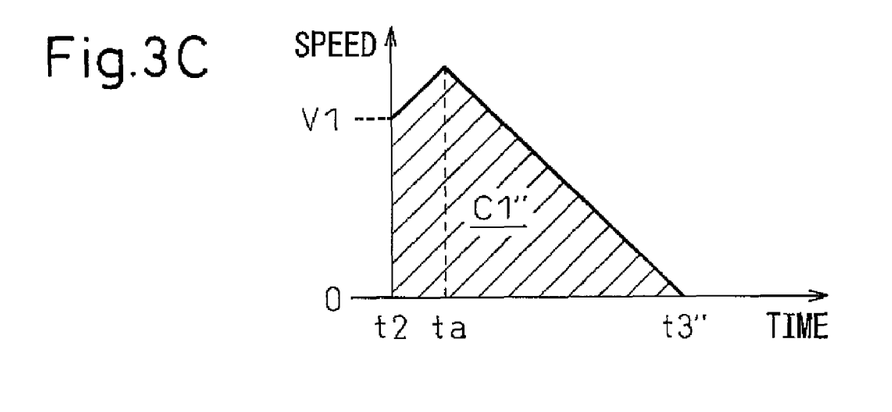
FIG. 3C is still another enlarged diagram of a relationship between a speed in a zone A3 and time shown in FIG. 2.

FIG. 3A to FIG. 3C are enlarged diagrams of a relationship between the speed in the zone A3 and time shown in FIG. 2. In these diagrams, dimensions of areas C1, C1', and C1" surrounded by a solid line that expresses speed and the line that expresses time, are respectively equal to each other. Among these diagrams, FIG. 3A shows merely a enlargement of a part of FIG. 2, and therefore, the explanation thereof is omitted.

In FIG. 3B, there is no small zone A31, and the speed of the rotation shaft 61 changes in constant acceleration from time t2. As can be seen from FIG. 3A and FIG. 3B, the acceleration of the rotation shaft 61 in FIG. 3B is smaller than the acceleration in the small zone A32 in FIG. 3A. Because there is no small zone A31 in FIG. 3B, a shift from the speed control to the position control can be carried out more smoothly. However, as shown in the diagrams, the time (t3'-t2) required for the rotation shaft 61 to stop is longer than the time (t3-t2) required in FIG. 3A.

In FIG. 3C, the speed of the rotation shaft 61 is controlled to increase after time t2, and to decrease again after time ta. The acceleration between time ta and time t2 and the acceleration between time t3" and time ta do not exceed the acceleration and deceleration ability of the rotation shaft 61. When the acceleration between time ta and time t2 is adjusted so as not to exceed the acceleration and deceleration ability of the rotation shaft 61 in this way, the time (t3"-t2) required for the rotation shaft 61 to stop can be set shorter than the time (t3-t2) required in FIG. 3A.

As shown in FIG. 1, in the present invention, the move instruction M1 output from the move-instruction generator 22 is input to the position loop controller 25 through the move-instruction smoother 23. The move-instruction smoother 23 carries out a smoothing operation so as to smooth the waveforms of the speed and the acceleration related to the move instruction M1.

Figure 4A:
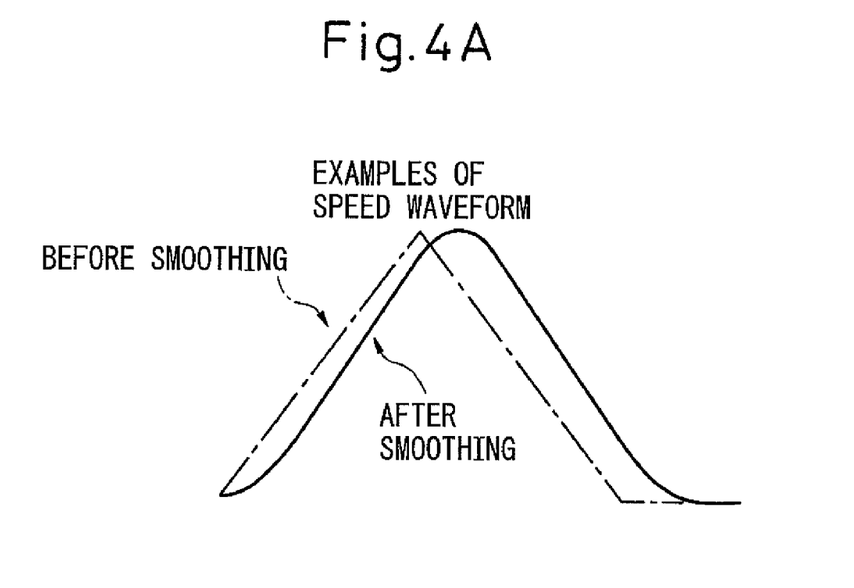
FIG. 4A is a diagram showing waveforms of speed smoothed by a move-instruction smoother.
Figure 4B:
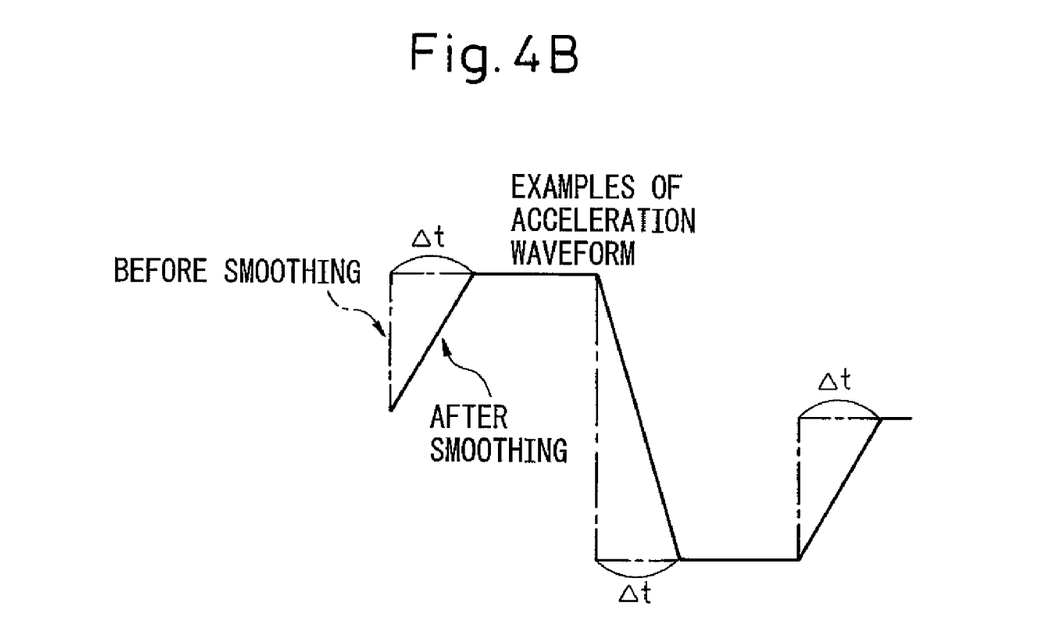
FIG. 4B is a diagram showing waveforms of acceleration smoothed by a move-instruction smoother.

FIG. 4A and FIG. 4B are diagrams showing waveforms of speed and acceleration smoothed by the move-instruction smoother 23, respectively. In these diagrams, waveforms before the smoothing are shown by dashed lines, and waveforms after the waveforms are smoothed by the move-instruction smoother 23 are shown by solid lines. FIG. 4A shows waveforms of speed included in the move instruction M1. As can be seen from FIG. 4A that the speed waveforms are smoothed to draw sinu soidal wave.

FIG. 4B shows waveforms of acceleration included in the move instruction M1. In FIG. 4B, the waveforms before the smoothing change in stepwise. When the waveforms are smoothed, the stepwise-change parts is changed linearly during a very short time Δt.

When the waveforms of speed and acceleration are smoothed as shown in FIG. 4A and FIG. 4B, these waveforms is changed relatively continuously. Therefore, a mechanical shock that occurs before the discontinuous waveforms are smoothed can be decreased.

While it is explained with reference to FIG. 1 that the stop-position instruction generator 20 generates a stop-position instruction, the higher level control apparatus 45 such as the PLC may also generate other stop-position instruction after the stop-position instruction generator 20 generates a stop-position instruction.

In this case, a difference between the stop-position instruction generated by the stop-position instruction generator 20 and the stop-position instruction generated by the higher level control apparatus 45 is calculated. Next, this difference is added to the summation of the move instructions from the current position to the stop position before the change. Then position control is performed based on the new total-move instruction initial value S1. It will be understood from this operation that even when the higher level control apparatus 45 generates other stop-position instruction, the fixed-position stop control apparatus 10 according to the present invention can operate correspondingly.

While the present invention is explained above with reference to representative embodiments, those skilled in the art can understand that the above alterations and various other alterations, omissions, and additions can be carried out, without deviating from the scope of the present invention.

What is claimed is:

1. A fixed-position stop control apparatus for a rotation shaft, comprising:
    a move-instruction generating means for generating a move instruction for each control cycle;
    a position loop control means for position controlling the rotation shaft for each control cycle according to the move instruction generated by the move-instruction generating means; and
    a speed loop control means for speed controlling the rotation shaft according to one of a speed instruction generated by a higher level control apparatus and a predetermined speed instruction,
    the fixed-position stop control apparatus capable of switching the speed control of the rotation shaft by the speed loop control means to the position control of the rotation shaft by the position loop control means,
    wherein the move instruction generated by the move-instruction generating means has acceleration smaller than acceleration corresponding to the acceleration and deceleration ability of the rotation shaft.

2. A fixed-position stop control apparatus for a rotation shaft, comprising:
    a move-instruction generating means for generating a move instruction for each control cycle;
    a position loop control means for position controlling the rotation shaft for each control cycle according to the move instruction generated by the move-instruction generating means; and
    a speed loop control means for speed controlling the rotation shaft according to one of a speed instruction generated by a higher level control apparatus and a predetermined speed instruction,
    the fixed-position stop control apparatus capable of switching the speed control of the rotation shaft by the speed loop control means to the position control of the rotation shaft by the position loop control means,
    wherein the move instruction generated by the move-instruction generating means has acceleration corresponding to the acceleration and deceleration ability of the rotation shaft.

3. The fixed-position stop control apparatus according to claim 1, further comprising an acceleration detecting means for detecting an acceleration of the rotation shaft during acceleration or deceleration,
    wherein the acceleration of the move instruction is an acceleration immediately before the switching from the speed control to the position control, detected by the acceleration detecting means.

4. The fixed-position stop control apparatus according to claim 1, further comprising a move instruction smoothing means for smoothing the move instruction generated by the move-instruction generating means, wherein the move instruction smoothed by the move instruction smoothing means is supplied to the position loop control means.

5. The fixed-position stop control apparatus according to claim 1, further comprising a stop-position instruction generating means for generating a stop-position instruction of the rotation shaft, wherein the move-instruction generating means generates the move instruction based on the stop-position instruction generated by the stop-position instruction generating means, the higher level control apparatus generates other stop-position instruction, and when the higher level control apparatus generates the other stop-position instruction, the position loop control means performs position control based on a difference between the stop-position instruction and the other stop-position instruction.

* * * * *